United States Patent [19]

Tort O.

[11] Patent Number: 4,531,710
[45] Date of Patent: Jul. 30, 1985

[54] EXPANDING GATE VALVE

[75] Inventor: Alejandro Tort O., Mexico City, Mexico

[73] Assignee: F.I.P., S.A. De C.V., Apdo, Mexico

[21] Appl. No.: 576,475

[22] Filed: Feb. 7, 1984

[51] Int. Cl.³ ............................................. F16K 25/00
[52] U.S. Cl. .................... 251/167; 251/196; 251/328; 251/362; 251/363; 251/365
[58] Field of Search ............... 251/167, 196, 199, 328, 251/327, 360, 362, 363, 365; 277/207 R; 220/378

[56] References Cited

U.S. PATENT DOCUMENTS

| | | | |
|---|---|---|---|
| 1,679,779 | 8/1928 | Oberhuber | 277/207 R |
| 2,604,507 | 7/1952 | Tyson | 220/378 X |
| 2,834,571 | 5/1958 | Hollander | 251/328 X |
| 3,006,601 | 10/1961 | Anderson | 251/328 X |
| 3,022,978 | 2/1962 | Kowalski | 251/362 |
| 3,106,219 | 10/1963 | Teston | 251/360 X |
| 4,189,127 | 2/1980 | Costantino | 251/167 X |

Primary Examiner—Harold W. Weakley
Attorney, Agent, or Firm—Vaden, Eickenroht, Thompson & Jamison

[57] ABSTRACT

There is disclosed an expanding gate valve having seats which are press-fitted into annular recesses in the valve body on opposite sides of the gate, each seat including a ring having at least one annular rib on its outer end which is of a harder material than that of the inner end of the recess and embedded therein to form a pressure barrier between the seat and recess.

7 Claims, 10 Drawing Figures

EXPANDING GATE VALVE

This invention relates in general to so-called expanding gate valves; and, more particularly, to improvements in valves of this type having seats for sealably engaging between the recesses in the body of the valve in which the seats are mounted and opposite sides of the expanded gate in the opened and closed positions of the gate.

As shown, for example, in U.S. Pat. No. 4,189,127, assigned to the assignee of the present application, the gate of a valve of this type includes a pair of gate sections having wedge-shaped surfaces on their inner sides which are spring-pressed into conformity with one another and thus into contracted positions in which the gate is free to move between the opened and closed positions. One such gate section is mounted on a stem which is connected to an operator on the valve body for reciprocating the one gate section, and thus the other gate section carried by it, between an open position in which ports through the gate sections are aligned with a flowway through the body, and a closed position in which the ports are out of alignment with the flowway and a solid portion of the gate is instead disposed over the flowway. More particularly, the upper and lower ends of the other gate section are engageable with stops in the valve body so as to cause the wedging surfaces of such other section to slide over those on the stem mounted section, and thereby expand the outer sides of the gate into sealing engagement with the inner ends of the seats as the gate is moved into its opened and closed positions.

In many valves of this type, the seat rings carry O-rings about their outer diameters which are sealably slidable within the inner diameters of the recesses, so that, when the gate is in closed position, the upstream seat is caused to "float" into tight sealing engagement with the side of the closed gate due to the force of line fluid acting over a cross-sectional area of the seat circumscribed by the outer diameter of the O-ring. Because of this force, together with the oppositely directed gate expanding force due to the wedging surfaces, the operator of the valve may not be able to overcome the frictional engagement between the seats and gate and thus move the one gate segment out of wedging position in order to open the gate.

U.S. Pat. No. 3,929,316 shows a gate valve of this type in which the outer ends of the seats and inner ends of the recesses have opposed grooves adapted to receive a seal ring of "Teflon" or the like which is of such size and shape as to be compressed between the seat and recess, as the opposite ends of the seat and recess move toward engagement. The compressed seal ring is intended to form a fluid-tight pressure barrier between the seat and recess, and thus limit the area on the outer end of the seat over which upstream line fluid is effective to urge the seat against the gate to less than the area of the inner end of the seat over which the same pressure is effective to urge the seat away from the gate, whereby the a resultant force due to line fluid actually urges the seat away from the gate.

As will be apparent from this patent, however, very close tolerances must be kept between the seal ring and the grooves in order to accomplish the intended purpose of the valve. Thus, if the ends of the seat and recess engage too early, the gate may not fully open or close. On the other hand, if they do not move close enough to one another when the gate is opened or closed, a portion of the seal ring may be extruded between them. Also, of course, as in other prior valves of this type, the seal ring is susceptible of wear and/or damage, and thus the valve may often have to be taken out of service to permit it to permit the ring to be repaired or replaced. Still further, neither repair nor replacement is practical in the field, and, unless there is a ready source of the seal rings, the valve must be returned to the shop for this purpose.

An object of this invention is to provide a gate valve of this type wherein the upstream seat is prevented from "floating" against the gate without the need for seal rings.

This and other objects are accomplished, in accordance with the illustrated embodiment of this invention, by a valve of the type described wherein each seat comprises a ring which has at least one annular rib on its outer end which is of a harder material than the oppositely facing inner end of the recess, and which is press fitted into the recess so as to cause the rib to become embedded in the inner end of the recess, and thus form a fluid pressure barrier which limits the area of the outer end of the upstream seat over which pressure of line fluid is effective to less than the area of the inner end of the seat over which the same pressure is effective. If the valve malfunctions because of debris between the inner end of the seat and the gate, or between the outer end of the seat and the inner end of the recess, the seat may be removed from within its recess to permit its inspection and repair, if necessary, and then reinstalled within the valve body with a minimum of downtime. More over, close tolerances between the inner ends of the seats and the opposite sides of the gate need not be maintained, because the ribs are free to embed themselves in the recesses to the extent required to maintain sealing contact between the inner ends of the seats and the gate in opened and closed positions. In fact, the tolerances are such as to permit the ribs to be embedded further in the event the seats are reinstalled.

Preferably, the inner end of each seat ring has a radially outer face for engaging the oppositely facing outer side of the gate, and a radially inner relieved surface having an outer diameter greater than that of the embedded rib. This not only more accurately defines the area over which line fluid acts to urge the upstream seat away from the gate, but also causes the seat and gate to seal with a higher unit pressure and thus increase the magnitude of line pressure which the valve may contain when closed.

It is also preferred that the radially inner and outer sides of the rib taper toward one another, not only to facilitate embedding of the rib into the inner end of the recess, upon initial installation, but also to permit the rib to be tightly embedded in the event the seat is reinstalled. Still further, there may be two or more ribs formed on the outer end of the seat, whereby the desired pressure barrier may be obtained with less embedding of each rib than would be required if the seat had only a single rib. Also, of course, each successive radially outer rib will in effect back up the radially inner rib or ribs in the event of leakage.

In the drawings, wherein like reference characters are used throughout to designate like parts:

Figure 1:
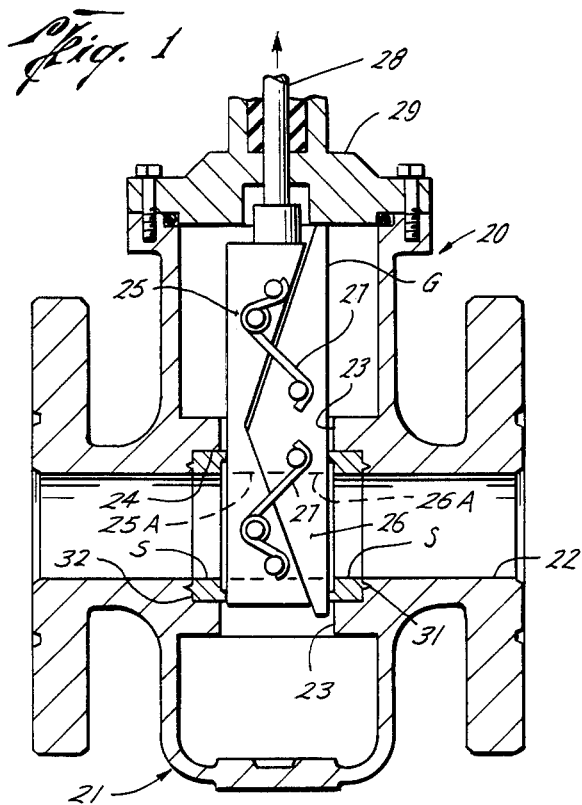
FIG. 1 is a vertical sectional view of an expanding gate valve constructed in accordance with one embodiment of the present invention, and with the gate raised to open position.
Figure 2:
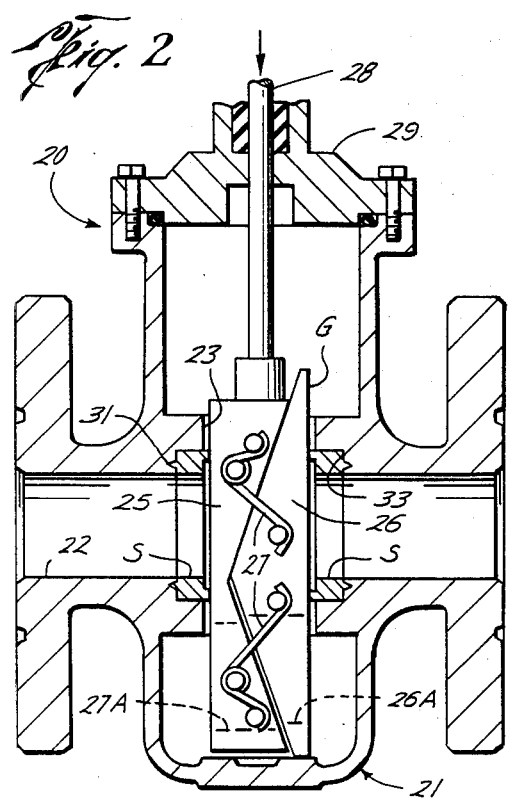
FIG. 2 is another vertical sectional view of the valve, similar to FIG. 1, but upon lowering of the gate to closed position.
Figure 3:
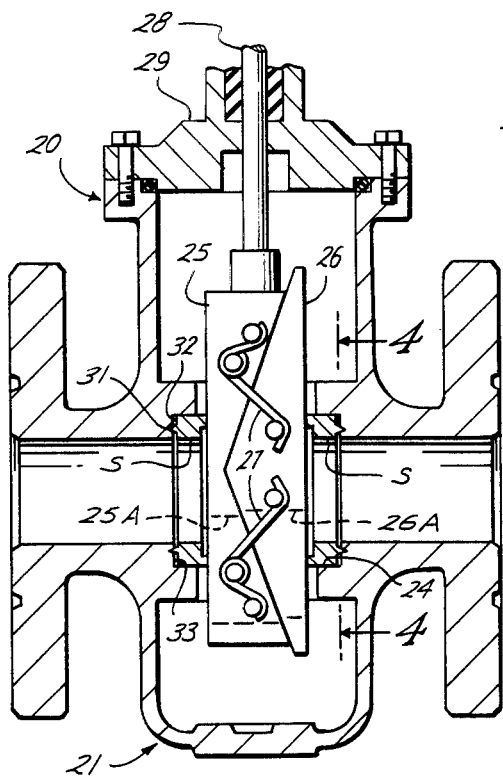
FIG. 3 is still another vertical sectional view of the gate of FIGS. 1 and 2, but during movement of the gate between opened and closed positions.
Figure 4:
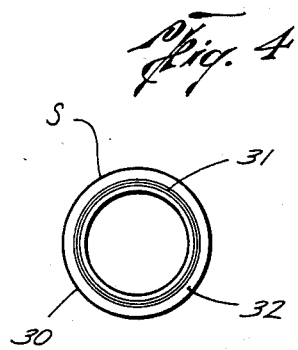
FIG. 4 is an end view of one of the seats, as indicated by broken lines 4—4 of FIG. 3.

With reference now to the details of the above-described drawings, the gate valve shown in FIGS. 1, 2, and 3, and indicated in its entirety by reference character 20, may be identical in construction to that of the aforementioned U.S. Pat. No. 4,189,127, except insofar as the construction of the seats and their cooperation with the remainder of the valve is concerned. Thus, the valve includes a valve body 21 having a flowway 22 therethrough and a guideway 23 therein intersecting the flowway. More particularly, the flowway 22 is radially enlarged at its intersection with each side of the guideway 23 so as to form annular recesses 24 facing the guideway.

As will be described in more detail to follow, a seat is installed within each recess to form continuations of the flowway, and a gate G is mounted on the valve body 20 for reciprocation within the guideway and between the inner faces of the seats in order to open and close the flowway. Thus, it is movable between an upper, open position, as shown in FIG. 1, and a lower, closed position, as shown in FIG. 2. The gate comprises a pair of gate sections 25 and 26 having wedge-shaped surfaces on their inner sides which are yieldably urged by springs 27 into conformity with one another when the gate is intermediate opened and closed positions, as shown in FIG. 3, but which are slidable over one another to expand their outer sides against the inner ends of the seats, as the gate moves into its opened and closed positions.

Gate section 25 is mounted on a stem 28 which extends through a bonnet 29 on the upper end of the valve body 21 to an operator (not shown) for causing the stem and thus the gate section 25, as well as the other gate section 26 carried by the gate section 25, to reciprocate within the guideway 23. More particularly, the upper end of gate section 26 is adapted to engage a stop on the lower side of the bonnet, when the gate is raised to the position of FIG. 1, and thereby cause the lower wedging surface on section 26 to slide downwardly over the lower wedging surface on the gate section 25 in order to expand the opposite sides of the gates against the inner ends of the seat. In this position, ports 25A and 26A formed in the gate sections are aligned with one another and the flowway 22 to form a full opening through the valve. Conversely, the lower end of gate section 26 is arranged to engage a stop in the lower end of the valve body when the gate is lowered to the position of FIG. 3, whereby its upper wedging surface is caused to slide upwardly along the upper wedging surface of gate section 25 to again cause the gate to expand and thus urge the outer sides thereof against the inner ends of the seats. In this position of the gate, however, the ports in the gate are over the flowway, and the flowway is closed by a solid portion of the gate.

As shown in FIGS. 1, 2 and 3, and as fully described in the aforementioned U.S. Pat. No. 4,189,127, the springs 27 have one or more turns carried by a pin on gate section 25 and opposite ends engaging pins on both gate sections and so arranged as to yieldably urge the wedging surfaces of the gate sections into conformity, as shown in FIG. 3. As will be apparent to those skilled in the art, the gate sections may instead be yieldably urged into conformity by springs of other types.

Each seat S comprises a metal ring 30 which, as shown in the embodiment illustrated in FIGS. 1 to 6, has an annular rib 31 on its outer end 32 which is of a harder material than the oppositely facing inner end 33 of the recess 24 in the valve body in which the seat is installed. In the illustrated embodiments of the invention, each seat ring is formed in its entirety of a harder material, although the seat may be of bi-metal construction.

Figure 5:
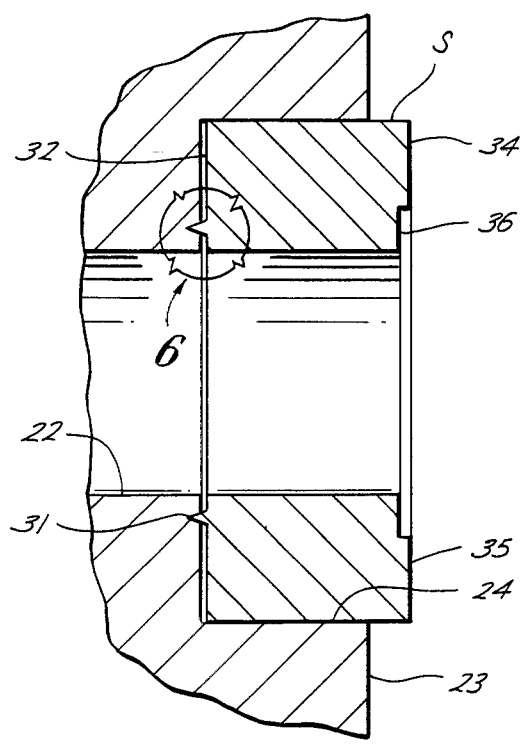
FIG. 5 is an enlarged sectional view of the seat, installed within its recess in the body of the valve.
Figure 6:
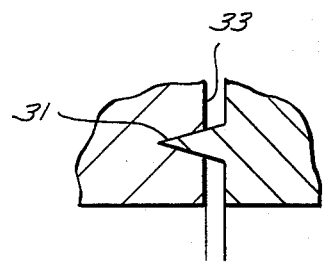
FIG. 6 is a still further enlarged sectional view of a portion of the seat and recess, and showing in detail the embedding of a rib on the outer end of the seat into the inner end of the recess.
Figure 6A:
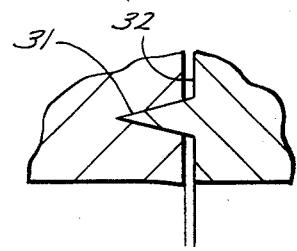
FIG. 6A is a view similar to FIG. 6, but upon outward movement of the seat with respect to the recess so as to further embed its rib within the inner end of the recess, as for example, upon expanding of the gate following installation of the seat in the recess.

The seat has an outer diameter which enables it to be press-fitted into the outer diameter of its recess and the rib to be embedded in the inner end 33 of the recess, as best shown in each of FIGS. 5 and 6. When initially installed, the seat may be pressed into the recess with just enough force to partially embed the rib within the end of the recess. However, following installation and movement of the gate to expand its outer sides, the seats may be urged further outwardly, depending on the tolerance between the inner ends of the seats and inner sides of the gate, so as to cause the rib 31 to be fully embedded, as shown in FIG. 6A. In any event, the only tolerance requirement is that the seat and rib be of such length relative to the axial length of the recess, and the fully expanded width of the gate, that, upon full expansion of the gate, the outer end of the seat will still be spaced from the inner end of the recess, as shown in FIG. 6A.

In any event, the rib is embedded to the extent necessary to form a fluid-tight barrier between the seat and valve body recess along substantially the diameter of the rib. Preferably, the rib is formed near the inner diameter of the seat ring so as to minimize the area of the outer end 32 of the seat over which line pressure is effective. However, the rib should not be so close to the inner diameter of the seat as to cause the inner diameter of the flowway 22 adjacent its intersection with the recess 24 to be deformed radially inwardly an amount which would interfere with pipeline pigs or other objects to move through the gate valve when opened.

With the gate closed, line pressure is also effective over at least the radially inner portion of the inner end of the seat, so that, as long as the rib is radially within this area, the net effective force on the seat urges it away from the gate. However, as also best shown in FIG. 5, the inner end 34 of the seat ring is preferably provided with a flat, radially outer surface 35 which conforms to the oppositely facing flat side of the gate, and a radially inner recessed surface 36 which has an outer diameter greater than that of the rib which is embedded within the inner end of the recess. This then defines the minimum area over which line pressure acts to urge the seat away from the gate, and thereby insures that the resultant force on the seat prevents its floating toward the gate.

Figure 7:
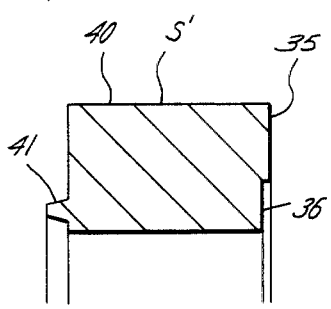
FIGS. 7, 8 and 9 are partial sectional views of alternative seat constructions.

As also previously described, the rib 31 has radially inner and outer sides which taper toward one another so as to facilitate embedding of the rib into the softer material at the inner end of the valve body recess. As best shown in FIGS. 6 and 6A, the inner and outer sides of the rib of seat S intersect to form a pointed outer end. However, as illustrated in FIG. 7, the rib 41 formed on the outer end of seat ring 40 of an alternative seat has inner and outer sides which terminate short of the outer end of the rib, so that the outer end of the rib may have a blunt, flat surface.

Figure 8:
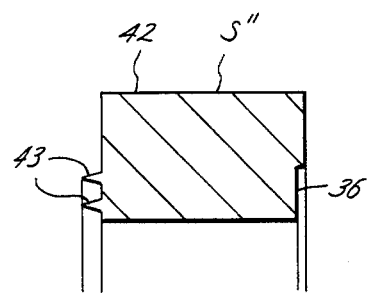
Figure 9:
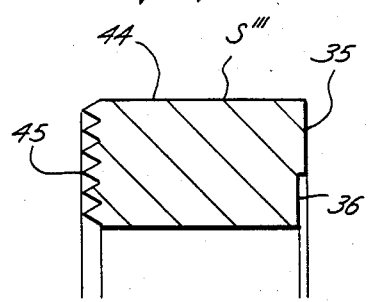

As shown in FIG. 8, in accordance with a further alternative embodiment, seat ring S" comprises a seat ring 42 having a pair of rings 43 formed on the outer end thereof, with the outermost ends of the ribs being pointed, as in the case of the seat S. FIG. 9 illustrates a further alternative embodiment of the invention wherein seat S'" comprises a seat ring 44 having ribs 45 formed over substantially the entire outer end of the seat ring. As previously described, the use of multiple ribs enables each outer rib to form a pressure barrier back up for an inner rib in the event that it does not form or maintain a pressure barrier. As shown in FIGS. 8 and 9, the inner end of each of the rings of the seats S" and S'" may be of substantially the same construction as that of the seats S and S', with the outer diameter of the recessed surface 36 thereof being of greater diameter than the radially innermost of the ribs.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An expanding gate valve, comprising
   a body having a guideway therein and a flowway therethrough intersecting opposite sides of the guideway,
   a gate for reciprocation within the guideway to open and close the flowway, and including
   a pair of gate sections having wedge-shaped surfaces on their inner sides which are yieldably urged into conformity with one another but are slidable over one another to expand their outer sides as the gate moves into its opened and closed positions,
   a stem connected to one of the gate sections for so reciprocating it, and thus the other gate section carried by the one gate section,
   the flowway being radially enlarged at its intersection with each side of the guideway to provide annular recesses facing the guideway, and
   an annular seat mounted within each recess for sealing between the body and gate in both the opened and closed positions of the gate,
   each seat comprising a ring which has at least one annular rib on its outer end which is of a harder material than the oppositely facing inner end of the recess and which is press fitted into the recess so as to embed the end of the rib into the inner end of the recess.

2. A valve of the character defined in claim 1, wherein
   the inner end of each seat ring has a radially outer face for engaging the oppositely facing outer side of the gate, and
   a radially inner relief having an outer diameter at least as great as that of the rib.

3. A valve of the character defined in claim 1, wherein
   the rib has inner and outer sides which taper toward one another.

4. A valve of the character defined in claim 1, wherein
   the seat ring has at least one additional rib formed on its outer end and surrounding the first-mentioned rib.

5. A seat for an expanding gate valve, comprising
   a ring of hard metal having a preformed, planar seating surface on one end and at least one annular rib on the other end which has inner and outer sides which taper toward one another.

6. A seat of the character defined in claim 5, wherein the one end of the ring has a radially inner relief within the seating surface whose outer diameter is larger than that of the rib.

7. A seat of the character defined in claim 5, wherein the ring has at least one other annular rib formed on its other end about the first-mentioned rib.

* * * * *